July 7, 1970     J. E. HOOVER     3,518,746
FILM WINDING AND STAKING METHOD

Filed Oct. 30, 1967     2 Sheets-Sheet 1

INVENTOR.
James E. Hoover

ATTORNEY

July 7, 1970  J. E. HOOVER  3,518,746
FILM WINDING AND STAKING METHOD
Filed Oct. 30, 1967  2 Sheets-Sheet 2

INVENTOR.
James E. Hoover
BY

Edward H. Loveman
ATTORNEY

United States Patent Office 3,518,746
Patented July 7, 1970

3,518,746
FILM WINDING AND STAKING METHOD
James E. Hoover, Binghamton, N.Y., assignor to GAF Corporation, New York, N.Y., a corporation of Delaware
Filed Oct. 30, 1967, Ser. No. 679,052
Int. Cl. B23p *21/00;* H01f *27/30;* G03b *1/56*
U.S. Cl. 29—430                                         2 Claims

ABSTRACT OF THE DISCLOSURE

This invention relates to a film winding and staking apparatus and method. A continuous segment of film is wound or spooled upon a spindle which is then replaced by a film cartridge body. The trailing end of the film is staked to a scroll disc or take-up core and then superimposed on the cartridge body. Subsequently, the assembled film and components are conveyed or slid to a pivotable guide plate, which is rotated to an angular inclination to facilitate the enclosure of the film and cartridge components by a film cartridge cover.

---

This invention relates to a film winding apparatus and method and, more particularly, to a novel apparatus and method for winding and staking a length of film preparatory to insertion into a film cartridge.

Recent developments in the photographic technology, particularly in connection with movie cameras and related photographic equipment, have created a considerably expanded commercial market for film cartridge assemblies. Movie cameras utilizing film cartridges possess advantages over the widely known and older type film roll loading cameras, in that they may be conveniently and rapidly loaded with cartridges by both professional photographers and amateurs. Although the film cartridge loaded camera has gained wide acceptance and has been technically evolved to a high degree of manufacturing efficiency, the mass or large quantity manufacture of film-containing cartridges for movie cameras has not kept pace with the required technical progress. In particular, film cartridge loading techniques as presently known, and the devices or apparatus for carrying out these techniques, are generally obsolescent and have not satisfied the presently ever-increasing industrial and commercial demands.

In essence, movie film cartridge assemblies are constituted of a generally planar thermoplastic body plate member having centrally located spindles or projections extending from both sides of the plate member. A roll of undeveloped film, as for example, 50 feet of 8 mm. film, is wound about one of the projections extending from the plastic plate member. The trailing end of the film is then positioned along the surfaces of peripheral flanges extending about the body plate member and which may be integrally molded with the latter. A take-up core or scroll disc is rotatably journaled on the other or oppositely extending spindle or projection, and is adapted to have the trailing edge of the film fastened or staked thereto. The assembled cartridge body plate member, take-up core and film may then be enclosed by a suitable plastic cover and sealed into an integral film cartridge assembly.

In order to obtain the aforedescribed film cartridge assemblies, presently employed apparatuses and manufacturing methods utilize essentially two separate and distinct assembly sequences. Initially, the film is wound about one of the projections extending from the plastic cartridge body member through the use of a suitable winding apparatus. After this manufacturing step or basic assembly sequence is completed, the film cartridge body sub-assembly, consisting of the wound film and plastic cartridge plate, must be removed from the apparatus and presented to a further assembling device. At this point, the trailing edge of the film is attached or staked to a take-up core which is adapted to be used in connection with the film winding mechanism of a movie camera. The take-up core with the attached film is then superimposed on the oppositely extending projection of the plastic cartridge plate. Subsequently, the assembled cartridge and film components are removed from the film staking device or apparatus and enclosed by a cartridge cover. From the foregoing, it becomes readily obvious that considerable time and effort is expended in transferring the cartridge and film sub-assembly from the initial to the final assembling, winding and staking apparatuses. Another drawback of prior art film winding and staking methods and assembling procedures lies in that excessive manual manipulation is required, all of which is conducive to making errors and causing delays in the manufacture of film cartridges.

The film winding and staking apparatus and method according to the present invention obviates the drawbacks and disadvantages encountered in the prior art by providing an apparatus of simple and unique construction adapted to wind and stake a continuous segment of film for assembly into a film cartridge. To this effect, the novel apparatus contemplates the utilization of a basic work reference surface or table containing operative devices for winding the film about the projection on a film cartridge body, staking the end of the film to a take-up core for assembly into the cartridge, and permitting manipulation of the cartridge for enclosing the latter by a suitable cartridge cover.

Essentially, the film winding and staking apparatus, according to the present invention, includes a rotatable power driven spindle about which a predetermined length of movie film is wound. Suitable film footage counter devices and cutters for severing the film prior to winding on the spindle may be used, such devices not forming a part of the present invention. A cartridge body is superimposed on the spindle, said cartridge having a projection adapted to contact the spindle. The spindle may be depressed and replaced by the projection on the cartridge body when the latter is pushed down onto the spindle. The loose trailing edge of the film is then conveyed to a scroll disc or take-up core mounted on a suitable rig or fixture on the apparatus, and staked to the take-up core. The staking sequence may be attained by simply crimping the plastic material of the take-up core side wall over the edges of the film, in a manner well known in the art.

Subsequently, the take-up core and staked film are positioned on the other projection of the cartridge body, whereby the projection acts as a short shaft about which the take-up core is rotatably journaled. The entire sub-assembly, consisting of the cartridge body, wound film and take-up core is now slid onto an angularly adjustable guide surface which has appropriate cartridge retaining guide rails adapted to retain the sub-assembly. The guide surface containing the cartridge sub-assembly is now inclined or tilted downwardly to facilitate the enclosing of the sub-assembly by a plastic film cartridge cover. At this time the entire assembly loaded film cartridge may be manually removed by an operator for further processing, such as sealing the cartridge and preparing it for shipment. From the foregoing, it becomes readily apparent that the film winding and staking apparatus and method according to the present invention is a much simpler, more efficient and economic procedure than that employed heretofore in the industry.

Accordingly, it is an object of the present invention to provide for an improved and novel apparatus for the winding and staking of a continuous length of film for use in a film cartridge.

Another object of the present invention is to provide an apparatus as described above incorporating a unique and advantageous rotatable and depressible spindle for winding the film in conjunction with a film cartridge assembling guide surface.

A further object of the present invention is to provide an apparatus as described above including a novel scroll disc staking fixture for attaching the trailing end of the film and assembling the latter into a suitable film cartridge.

A still further object of the present invention is to provide an apparatus as described above including adjustable guide means for the assembled film and cartridge, whereby the guide means facilitates the enclosing of the assembly by a film cartridge cover.

Yet another object of the present invention is to provide a novel and unique method for inserting and staking a continuous length of film into a film cartridge.

Still another object of the present invention is to provide a method of winding a continuous length of film for insertion into a film cartridge, staking the end of the film to a take-up core to be subsequently inserted into the film cartridge, and maneuvering the film and cartridge assembly into position for enclosure by a film cartridge cover.

These and other objects and many of the attendant advantages of this invention will be readily appreciated as the same becomes better understood by reference to the following detailed description when considered in connection with the accompanying drawings in which.

Figure 1:
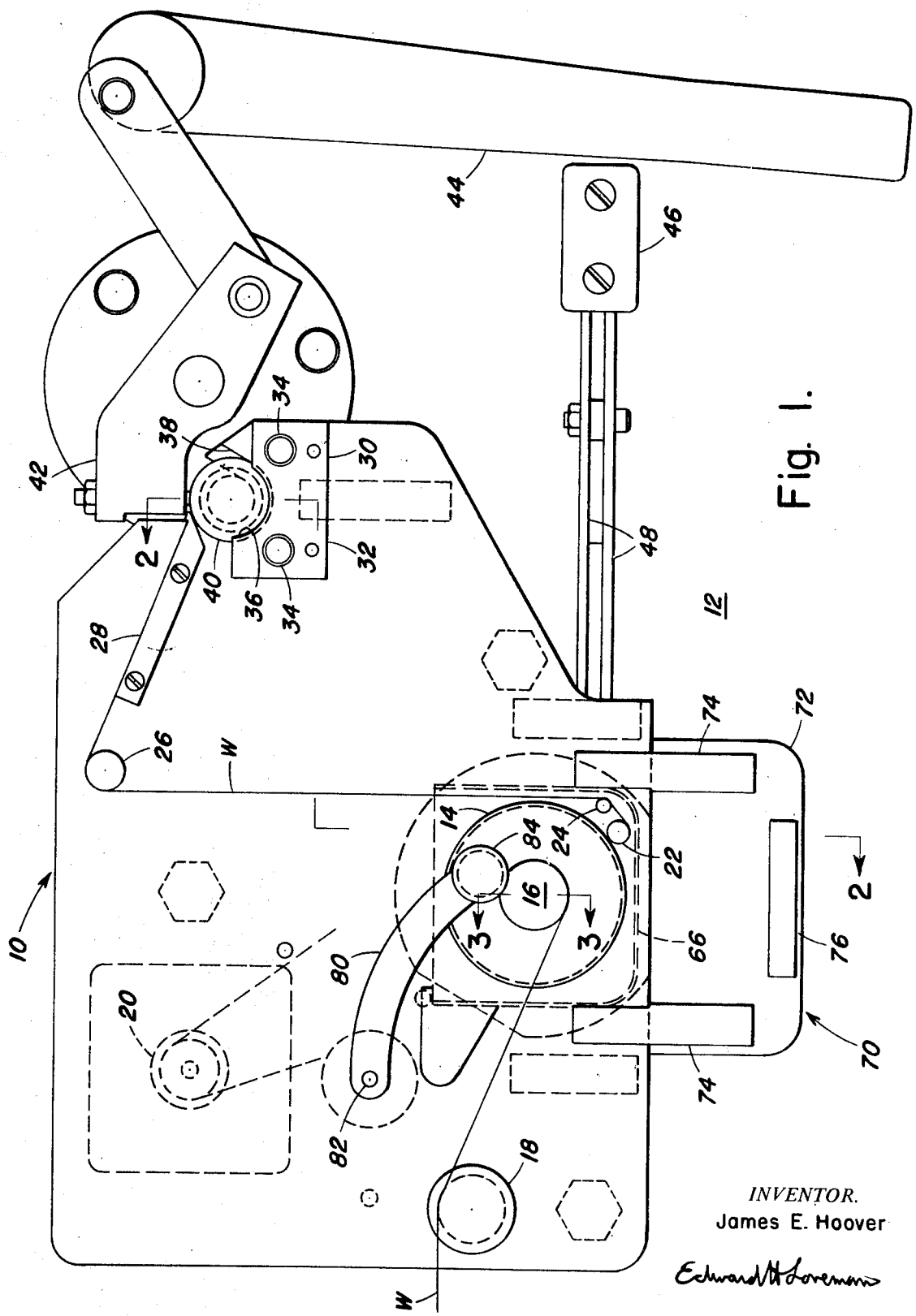
FIG. 1 is a plan view of the film winding and staking apparatus according to the present invention.

Referring now to the drawings, wherein like reference characters designate like or corresponding parts throughout the several views, a film winding and staking apparatus is generally designated as 10. The apparatus 10 may be a part of and mounted on a common work plane with a film supply device, film footage counter and film punch and cutter (not shown).

The apparatus 10 includes a substantially flat table-top or work reference surface 12. A disc-type guide plate 14 encompasses a rotatable spindle member 16 extending above work reference surface 12. A length of film web W is adapted to be guided by a grooved guide roller 18 from a film cutter device (not shown), and have its leading end encompassing spindle member 16. The film end may be slotted and grooved so that it can be interlocked and looped about the spindle member 16. Rotation is imparted to the spindle member 16 by a suitable motor drive 20 positioned below work reference surface 12.

As the film W is wound in a scroll about the spindle member 16, a film footage counter (not shown) will measure the length of film conveyed toward apparatus 10 and at the appropriate time, for example, after measuring 52 feet of film, actuate the cutter device to sever this length from the continuous supply of film. Concurrently, or immediately thereafter, the motor drive 20 may be stopped, either manually or through automatic means associated with the film footage counter, thereby stopping rotation of the spindle member 16.

The trailing edge of the film segment W, which has been wound about spindle member 16 on plate 14, is now entrained about a guide pin 22 extending above work reference surface 12 adjacent to plate 14. If desired, the film may also be extended about a guide pin 24 positioned in proximity to guide pin 22. This end of the film is now led past and entrained about a further guide pin 26 extending up from work reference surface 12, and conveyed along a guide rail member 28 toward a staking assembly 30.

The staking assembly 30 includes a jig or fixture plate 32 mounted onto and fastened to work reference surface 12 by suitable fastener screws 34. At the juncture of fixture plate 32 and guide rail member 28, the plate 32 includes an arcuate cut-out 36 encompassing an aperture 38 in surface 12. Cut-out 36 is adapted to receive a plastic film cartridge scroll disc or take-up core 40. The staking assembly 30 incorporates a clutch 42 operable by a manual lever 44. Clutch 42 imposes a clamping force upon scroll disc 40 so as to lock the latter into cut-out 36 and aperture 38 during the film staking sequence.

At this point, the film trailing edge, which may have a narrow tongue portion, is attached to the take-up core 40 by a staking or sealing sequence. Essentially, the film W has its end tongue portion glued, cemented, or staked to the core 40 by crimping portions of the core side wall over the film and tongue. Although this operation is commonly referred to as "staking" the film end to the core 40, it will be obvious to one skilled in the art, that this terminology encompasses glueing, cementing, taping or crimping the film to the take-up core.

After the film has been staked to the take-up core 40, a cartridge body 66 of standard design well known in the art is positioned such that a centrally located projection or spool in the supply section of the cartridge body is over the spindle member and film scroll. A manually operable lever 46 is then depressed to cause the spindle member 16 to recede below the surface of the guide plate 14 and simultaneously the cartridge body is manually depressed by the operator to contact the surface of the plate 14 whereby the film scroll encompasses the projection spool of the cartridge body 66.

Figure 3:
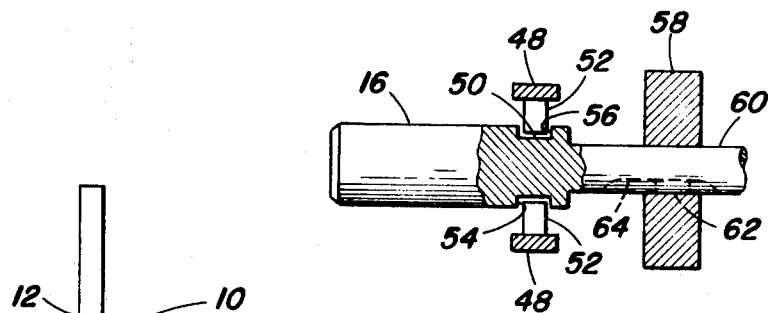
FIG. 3 is a sectional view taken along line 3—3 in FIG. 1 and illustrating details of the spindle actuating mechanism.
Figure 2:
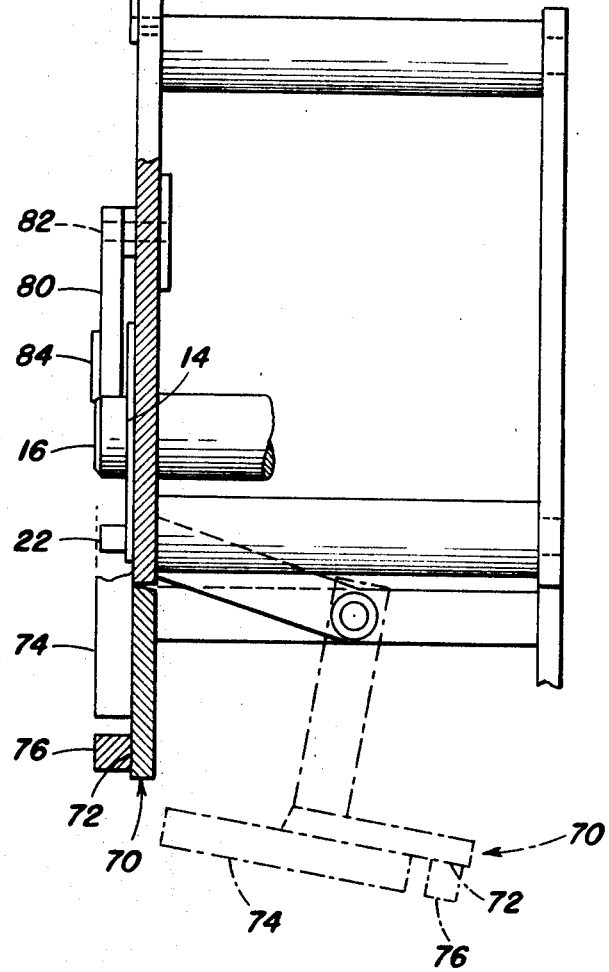
FIG. 2 is a sectional view taken generally along line 2—2 in FIG. 1 with certain details omitted.

As shown most clearly in FIG. 3, the lever 46, which recesses the spindle member 16 is comprised of a linkage or bar 48 extending into proximity with the lower portion of spindle member 16 below reference surface 12. An annular groove 50 is cut into spindle member 16 and is adapted to receive pins 52 which are attached to bar 48. As the bar is moved up or down by the manipulation of lever 46, the pins 52 will impart, respectively, lifting or depressing forces on the upper land 54 or lower land 56 of groove 50. The groove 50 must be annular in order to permit rotation of the spindle member 16 in response to actuation of motor drive 20 without interference by pins 52. Guide pins 22 and 24 are connected to spindle member 16 by suitable linkage means, whereby elevation or depression of spindle member 16 will simultaneously elevate or lower guide pins 22 and 24 above or below reference surface 12.

Connection between motor drive 20 and spindle member 16 is provided by mounting a drive pulley 58 on a lower shaft extension 60 of spindle member 16. The pulley 58, which has a suitable belt drive connected to motor drive 20, is keyed onto shaft extension 60 by means of a key 62. An elongate key slot 64 in shaft extension 60 receives the key and permits axial reciprocation of the spindle member 16 relative to the pulley 58 during manipulation of lever 46.

After the film scroll has been transferred to the cartridge body 66 the take-up core 40 is removed from the staking assembly 30 and the cartridge body 66 is slid or conveyed onto a guide plate assembly generally designated as reference numeral 70. The assembly 70 includes a movable support plate 72 adapted to be coextensive with work reference surface 12 in one position and downwardly inclined in another or second position. Mounted on support plate 72 are spaced side guide rails 74 and a bottom guide rail 76, which will accurately position or support the cartridge body 66 on support plate 72. Thus, with the guide plate assembly 70 positioned to be coextensive with surface 12, the cartridge body 66 is positioned between the guide rails 74 and the guide rail 76, and the film segment extending from the wound portion to the end staked to take-up core 40 is threaded about the periphery of the cartridge body 66, which may have suitable flanges for this purpose. The take-up core 40 is now superimposed over an upwardly extending projection or shaft portion in the take-up portion of the cartridge body 66.

At this time the guide plate assembly 70 may be moved downwardly to its second or inclined position to facilitate manual superposition of a plastic cartridge cover over the cartridge and film assembly, and the entire loaded film cartridge may be removed for further processing. The inclination of guide plate assembly 70 permits the concurrent raising of spindle member 16 and insertion of a successive film segment for winding thereabout while the loaded film cartridge assembly is being removed from apparatus 10.

During winding of the film W upon spindle member 16 it may be advantageous to maintain a constant surface pressure on the winding film in order to cause it to wind into a tightly-wound coil. In order to provide the required pressure on the film, an oscillatable or pivotable arm member 80 is mounted above work reference surface 12 and is adapted to move in parallel relationship therewith. One end of arm member 80 is pivotable about a pivot point or pin 82, while the other or distal free end of the arm member 80 may be swung toward or away from spindle member 16. A roller 84 is mounted on the end of arm member 80 so as to provide rolling contact with the film being wound or spooled upon the spindle member. When the film has been wound upon the spindle member 16, the arm member 80 may be swung away in order to facilitate placement of the cartridge 66 upon guide plate 14.

From the foregoing, it becomes readily apparent that the present invention provides for an efficient and simply constructed film winding and staking apparatus and method.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:
1. A method of assembling film cartridges comprising the steps of:
   winding a predetermined length of film about a rotatable spindle member,
   staking the trailing edge of said film to a take-up core,
   superposing a cartridge body film supporting plate having a generally planar film supporting plate and centrally located raised portions projecting from opposed surfaces thereof on said spindle member while concurrently lowering the latter, whereby said spindle member is replaced by one of said raised portions,
   conveying and guiding said cartridge body and film to and from an adjustable guide surface, and
   mounting said take-up core and stalked film end on the other one of said raised portions.
2. The method as defined in claim 1, wherein said adjustable guide surface supporting said cartridge and film assembly is then inclined downwardly by tilting the same, and
   encompassing said assembly with a cartridge cover.

References Cited

UNITED STATES PATENTS

| 728,183 | 5/1903 | Varley | 29—605 X |
| 1,855,876 | 4/1932 | Barker | 29—429 X |
| 2,658,263 | 11/1953 | Scott. | |
| 2,951,656 | 9/1960 | Wellman | 242—71.1 |
| 3,187,418 | 6/1965 | Kent. | |
| 3,325,889 | 6/1967 | Meli | 29—430 |

WAYNE A. MORSE, Jr., Primary Examiner

U.S. Cl. X.R.

29—205, 476.5, 605; 53—21, 118, 390; 242—55.13

Disclaimer

3,518,746.—*James E. Hoover,* Binghamton, N.Y. FILM WINDING AND STAKING METHOD. Patent dated July 7, 1970. Disclaimer filed Sept. 30, 1982, by the assignee, *Eastman Kodak Co.*

Hereby enters this disclaimer to all claims of said patent.

[*Official Gazette April 5, 1983.*]